(12) United States Patent
Thomas et al.

(10) Patent No.: US 10,429,950 B2
(45) Date of Patent: Oct. 1, 2019

(54) DIFFUSIVE EMISSIVE DISPLAY

(71) Applicant: Hewlett-Packard Development Company, L.P., Houston, TX (US)

(72) Inventors: Fred Thomas, Fort Collins, CO (US); Bruce E. Blaho, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/326,292

(22) PCT Filed: Jul. 16, 2014

(86) PCT No.: PCT/US2014/046885
§ 371 (c)(1),
(2) Date: Jan. 13, 2017

(87) PCT Pub. No.: WO2016/010534
PCT Pub. Date: Jan. 21, 2016

(65) Prior Publication Data
US 2017/0212610 A1    Jul. 27, 2017

(51) Int. Cl.
*G06F 3/0354* (2013.01)
*G06F 3/03* (2006.01)
(Continued)

(52) U.S. Cl.
CPC ......... *G06F 3/03542* (2013.01); *G02B 5/008* (2013.01); *G02B 5/0242* (2013.01); *G02B 5/0278* (2013.01); *G02B 5/0294* (2013.01); *G06F 3/0304* (2013.01); *G06F 3/0321* (2013.01); *G06F 3/03545* (2013.01);
(Continued)

(58) Field of Classification Search
CPC ............... G06F 3/03542; G06T 11/203; G02B 2207/113; G02B 2207/101
See application file for complete search history.

(56) References Cited

U.S. PATENT DOCUMENTS 5,093,147 A * 3/1992 Andrus ................ B41M 3/06
346/98
5,477,012 A * 12/1995 Sekendur ............ G06F 3/03545
178/18.09
(Continued)

FOREIGN PATENT DOCUMENTS

CN    101681999    3/2010
CN    102135842    7/2011
(Continued)

OTHER PUBLICATIONS

Ankri, R. et al., "A New Method for Cancer Detection Based on Diffusion Reflection Measurements of Targeted Gold Nanorods," Jan. 31, 2012, pp. 1-6, International Journal of Nanomedicine, Available at: <ncbi.nlm.nih.gov/pmc/articles/PMC3273979/>.
(Continued)

*Primary Examiner* — Mihir K Rayan
(74) *Attorney, Agent, or Firm* — Brooks Cameron & Huebsch PLLC

(57) ABSTRACT

A display includes a display stack to generate a digital display image. A media layer includes a plurality of diffusive emissive elements disposed in a predetermined pattern. The diffusive emissive elements on the media layer emit a scattered signal in response to light incident to the media layer.

14 Claims, 5 Drawing Sheets

(51) Int. Cl.
   *G02B 5/00* (2006.01)
   *G02B 5/02* (2006.01)
   *G06T 11/20* (2006.01)

(52) U.S. Cl.
   CPC ...... *G06T 11/203* (2013.01); *G02B 2207/101* (2013.01); *G02B 2207/113* (2013.01)

(56) References Cited

U.S. PATENT DOCUMENTS

| | | | |
|---|---|---|---|
| 6,548,768 B1* | 4/2003 | Pettersson | G06F 3/03545 |
| | | | 178/18.01 |
| 7,619,607 B2* | 11/2009 | Zhang | G06F 3/037 |
| | | | 345/104 |
| 8,692,212 B1* | 4/2014 | Craft | G06F 3/0317 |
| | | | 250/458.1 |
| 9,836,164 B2* | 12/2017 | Craft | G06F 3/0317 |
| 2002/0067332 A1* | 6/2002 | Hirakata | G09G 3/342 |
| | | | 345/102 |
| 2006/0139338 A1* | 6/2006 | Robrecht | G06F 3/0488 |
| | | | 345/175 |
| 2009/0279170 A1 | 11/2009 | Miyazaki et al. | |
| 2009/0326614 A1 | 12/2009 | El-Sayed et al. | |
| 2011/0086676 A1* | 4/2011 | Choi | B82Y 20/00 |
| | | | 455/567 |
| 2011/0102716 A1* | 5/2011 | Park | G02F 1/133514 |
| | | | 349/106 |
| 2011/0151605 A1* | 6/2011 | Yoon | G02B 5/008 |
| | | | 438/29 |
| 2011/0285942 A1* | 11/2011 | Guo | G02B 5/008 |
| | | | 349/96 |
| 2013/0307830 A1* | 11/2013 | Bao | G06F 3/0425 |
| | | | 345/179 |
| 2014/0028744 A1 | 1/2014 | Hashi et al. | |
| 2014/0103291 A1 | 4/2014 | Mastro | |
| 2014/0117252 A1* | 5/2014 | Craft | G06F 3/0317 |
| | | | 250/458.1 |
| 2017/0212611 A1* | 7/2017 | Thomas | G06F 3/0386 |
| 2017/0262090 A1* | 9/2017 | Thomas | G06F 3/042 |

FOREIGN PATENT DOCUMENTS

| | | |
|---|---|---|
| CN | 102549328 | 7/2012 |
| CN | 103180132 | 6/2013 |
| TW | 201207674 A1 | 2/2012 |
| WO | WO 2006065380 A1 | 6/2006 |
| WO | WO-2012102690 | 8/2012 |
| WO | WO-2013035990 A2 | 3/2013 |
| WO | WO-2013035991 A2 | 3/2013 |
| WO | WO-2013183849 A1 | 12/2013 |

OTHER PUBLICATIONS

Berkovitch, N. et al., "Nano-plasmonic Antennas in the Near Infrared Regime," Journal of Physics: Condensed Matter, Jan. 6, 2012, pp. 1-16, Available at: <stacks.iop.org/JPhysCM/24/073202>.

Hu, M. et al., "Gold Nanostructures: Engineering their Plasmonic Properties for Biomedical Applications," Chemical Society Reviews, Jul. 6, 2006, pp. 1084-1094, No. 35, The Royal Society of Chemistry 2006.

Weili Shi, Y. et al., "Gold Nanoshells on Polystyrene Cores for Control of Surface Plasmon Resonance," American Chemical Society, Nov. 5, 2004, pp. 1610-1617, Langmuir, vol. 21, No. 4, 2005.

* cited by examiner

DIFFUSIVE EMISSIVE DISPLAY

BACKGROUND

The need to interconnect the analog world of creative drawing, illustrating, drafting and writing with digital applications has created a set of digital devices designed to translate the motion of a pen's into high resolution, analog-like input onto a digital display. Input devices typically either simulate a finger as a touch input system, or an input system that operates by activation of one or more optical, pressure and electrical sensors. However, input solutions coupled to the projective capacitive touch sensors of the display provide limited functionality, whereas electrical sensors can negatively impact display and product thickness and can increase the cost of such a system.

DETAILED DESCRIPTION

This disclosure relates to diffusive emissive elements arranged on a medium layer in a predetermined, positionally encoded pattern that emit light in a diffuse, or scattered, manner in response to a non-visible incident light. Diffusive emissive elements are elements that have diffusive emissive properties in response to non-visible light (e.g., light outside the visible spectrum). The diffusive emissive elements are arranged in a predetermined encoded pattern on a media, such as paper, or a non-visible light absorbing layer, or a transparent layer disposed on a non-visible light absorbing material layer. As employed herein, a scattered emission and/or reflection is one that provides, at a minimum, a non-visible light signal that is able to enter an optical aperture of a detector and/or imaging device.

The diffusive emissive elements disposed on the medium layer can be provided as a layer for application in a visual display. An apparatus such as a digital display can include a display stack having at least one layer to generate a digital display image. The display stack typically includes multiple layers including, for example, a liquid crystal display (LCD) to generate the display image. The apparatus can include a medium layer that includes the diffusive emissive elements arranged in the encoded pattern. For example, the medium layer can be a clear plastic film with substantially non-visible near-IR diffusely emissive patterns disposed thereon, rendered via coating, printing, and overlay or otherwise applied to the medium layer. The diffusive emissive elements provide a diffuse emission of light in response to non-visible light (e.g., infrared (IR)) applied to the diffusive emissive elements. The diffusive emissive elements emit a signal (e.g., reflect or fluoresce) in response to non-visible light while the medium layer does not. The diffusive emissive elements and the medium layer are substantively optically transparent to visible light generated from the display stack.

The medium layer can be a layer of the display stack, or the diffusive emissive elements can be disposed on the display stack itself. The diffusive emissive elements can be illuminated via a non-visible light source (e.g., near-IR) such as a light source integrated with an interactive digital pen. Upon illumination, each of the illuminated diffusive emissive elements emit a signal in a diffused (e.g., scattered or isotropic) manner, such that a detector can collect information corresponding to a relative position of the diffusive emissive elements, and decode the information to determine a position of the pen on the display. This position can then be used to create an illuminated visible representation of the pen stroke on the display.

Figure 1:
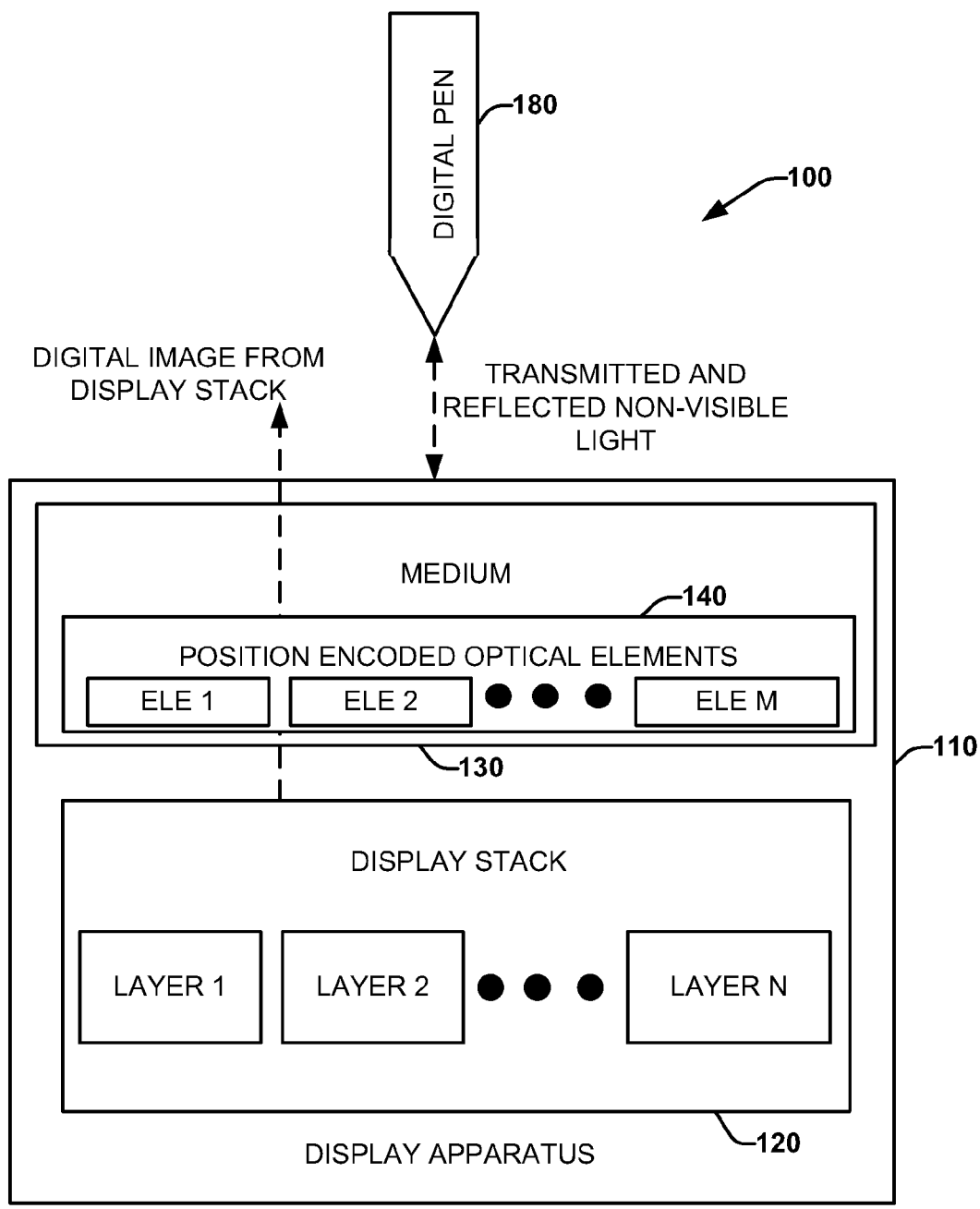
FIG. 1 illustrates an example of a system to receive position encoded optical information from a display.

FIG. 1 illustrates an example of a system 100 to receive position encoded optical information from a display. A display apparatus 110 can include a display stack 120 having at least one layer shown as layers 1 though N to generate a digital display image, with N being a positive integer. The display stack 120 typically includes multiple layers including an LCD or a light emitting diode (LED) layer, for example, to generate the display image. Other example layers in the display stack 120 can include reflective films, backlighting layers, light diffuser films, light polarizer films, color filter films, and optically clear adhesives (OCA's), for example, to bind the respective layers together in the display stack 120. In the example of an interactive display apparatus, a layer that allows for an input, such as a touch sensitive capacitive layer, can be included in the display stack. The relative position of layers in the display stack is not limited to the listing provided herein, as layers can be added, removed, or rearranged in accordance with the requirements of a particular display apparatus.

As shown in FIG. 1, the display apparatus 110 can include a medium layer 130 that can include position encoded diffusive emissive elements 140 shown as elements ELE 1, ELE 2, though ELE M, with M being a positive integer. The diffusive emissive elements 140 have an optical characteristic that varies in response to non-visible light applied to the diffusive emissive elements. The non-visible light can include near-IR light (e.g., about 750 to 1000 nanometer wavelength) generated from a detector, such as a digital pen 180. The digital pen 180 (illustrated with respect to FIG. 4 below) can include an IR LED source that can be strobed at a respective duty cycle and frequency to generate the non-visible light. In one example, the non-visible light reflects from the diffusive emissive elements 140 to indicate location and movements of the digital pen 180 as it is directed toward and about the display apparatus 110.

For example, the diffusive emissive elements 140 (e.g., dots representing the elements) can be reflective/emissive to near-IR. A background layer can be absorptive (e.g., non-reflective) to near-IR radiation from the digital pen 180. For example, this absorptive layer property can be inherent in the underlying display. A camera (not shown) can be integrated with the digital pen 180, and can receive and record the pen's movement by discriminating between the light emitted from the position encoded diffusive emissive elements 140 in contrast to the absorptive background layer.

As shown, a display image is transmitted from the display stack 120 though the media layer 130 and is visible to the user at the output of the display apparatus 110. By increasing the amount of reflected light (e.g., from the position encoded diffusive emissive elements 140), the digital pen 180 can decode a stronger signal having a higher signal to noise ratio (SNR) (e.g., greater contrast difference between position encoded diffusive emissive elements 140 and background) causing higher SNR. The diffusive emissive elements 140 can be disposed on the media layer 130 (e.g., a pattern printed/deposited on media layer 130) and can be excited via the non-visible light source (e.g., near-IR) generated from the digital pen 180, for example. Upon illumination, the diffusive emissive elements 140 return encoded data corresponding to the encoded pattern back to a processor where the encoded data can be decoded. The decoded information corresponds to movements of the digital pen 180 such as the recording of strokes characteristic of images, such as a digital signature.

Figure 2:
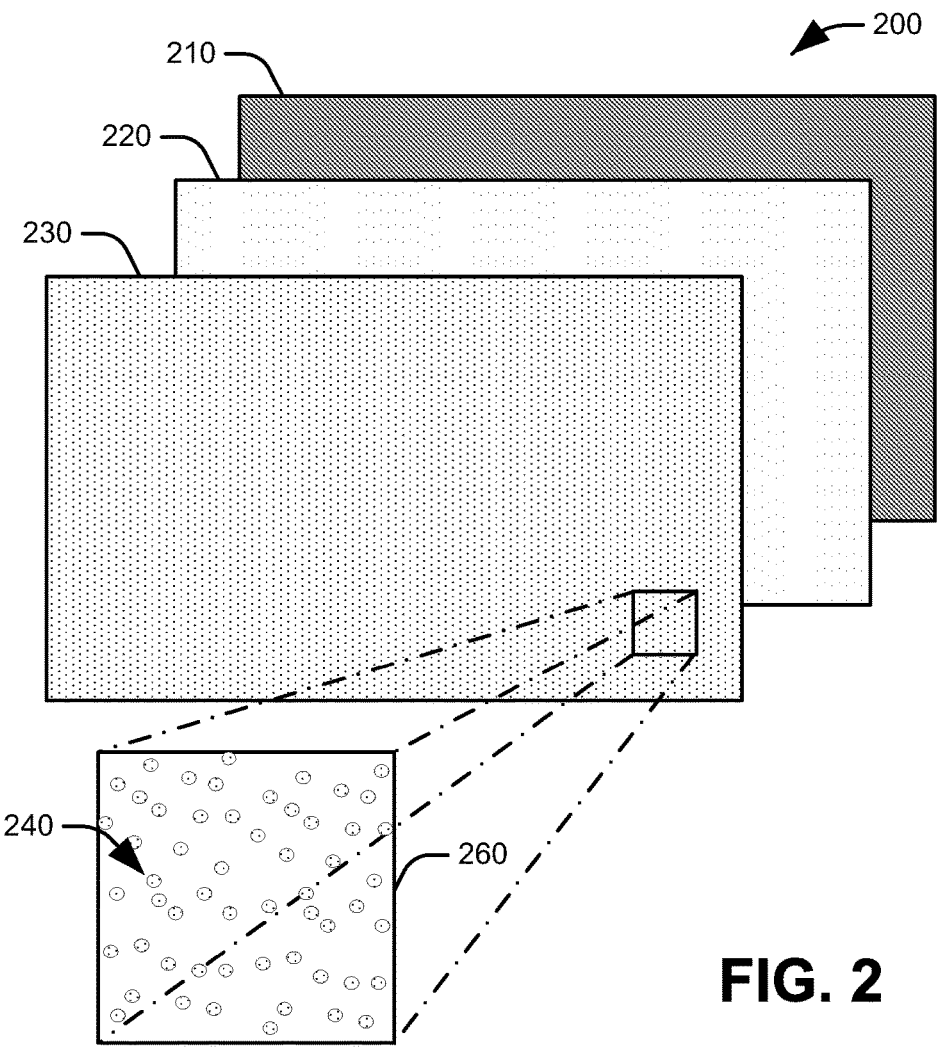
FIG. 2 illustrates an example position encoded display apparatus.

FIG. 2 illustrates an example display apparatus 200 that can include one or more layers to provide visual information as well as additional functionality for various user interactions. For example, the display apparatus 200 can incorporate any display technology, for example LCD, LED, organic LED (OLED), active matrix OLED (AMOLED), or any other display technology. Display apparatus 200 can include a multiplicity of layer, including but not limited to, a LCD brightness control linear polarizer and backlight layer 210 bonded to a projected capacitive touch (PCT) 220 layer. Display apparatus 200 can further include a substrate or medium layer 230 that does not affect the light transmitted through the medium layer 230. The medium layer 230 can in turn be applied to the surface of the display apparatus 200 via a bonding agent. The medium layer 230 can include a plurality of diffusive emissive elements 240 that can be arranged in a predetermined pattern containing encoded information. In other examples, the diffusive emissive elements 240 may be applied directly to a surface of display apparatus 200.

When disposed upon or formed within a suitable medium layer 230, the diffusive emissive elements 240 are substantively not visible or not visible to the naked eye. The diffusive emissive elements 240 can be deposited on or otherwise formed within the medium layer 230 using any method or system, including but not limited to, photolithography and conventional printing technologies, such as ink jet, screen and flexographic printing. In one example, diffusive emissive elements 240 are embedded in a transparent carrier (e.g., a transparent ink) that is used to print the predetermined pattern onto medium layer 230.

The diffusive emissive elements 240 can be disposed on the medium layer 230 in a unique, specific, spatial or positional pattern, as shown in box 260 as a magnified view of the arrangement of diffusive emissive elements 240 on medium layer 230. The use of such a pattern creates a positional relationship between the diffusive emissive elements 240 based on their location on the display 200. The positional relationship between relative diffusive emissive elements 240 can be read to determine a specific location on the medium layer 230 and display 200. The transparency of diffusive emissive elements 240 and the medium upon which elements 240 are disposed permits the use of such systems and methods with display apparatuses. A transparent, predetermined encoded pattern of diffusive emissive elements 240 disposed in, on, or about a transparent medium layer 230 provides input systems and methods with a high degree of accuracy while maintaining a high fidelity visual display or a printed page.

Detection based technologies employing a detector use a predetermined series of the diffusive emissive elements 240 applied in the form of fiducials, dots, or similar marks. The marks are used to ascertain information from the encoded pattern, e.g., a position on the display. The positional relationship between the diffusive emissive elements 240 on the display apparatus 200 permit information to be determined by a detector and associated electronics/software. As the diffusive emissive elements 240 emit a signal in response to light incident to the display apparatus 200, a detector located proximate the display apparatus 200 can sense the emitted signal.

The predetermined pattern can be disposed on clear display films employing particles that are diffusely emissive at a near-IR irradiance wavelength based on excitation from a near-IR light source irradiator (e.g., a near-IR LED). Materials that exhibit the desired diffuse emissive properties should be substantially clear in the visible light spectrum (e.g., 400 nm to 700 nm) when disposed on a transparent film or visual display. For example, the light source can interact with metallic nanoparticles to induce the plasmonic resonance phenomena with its associated near-IR light scattering, as well as induce fluorescence from semiconducting nanoparticles (e.g., quantum dots) or near-IR organic fluorescent dyes, and alternatively provide for scattered reflection interactions with organic based films. The preceding examples are a set of non-limiting examples. The distributed elements could be tuned to provide the diffuse reflections across the entire near-IR spectrum, e.g., about 725 nm to about 1000 nm, or a more specific wavelength, e.g., about 750 nm. Each mechanism can be disposed on transparent medium layer 230 prepared as one of the layers display apparatus 200, or applied directly to a surface of display apparatus 200. Printable ink or other patternable material carriers would include constituent diffusive emissive elements 240 to provide for a diffuse emission in response to an incident light.

The carrier (e.g., ink) and diffusive emissive elements embedded therein can be deposited on transparent films, such as would be used to create a display screen stack, e.g., display apparatus 200, as well as other printed material, e.g., paper. An interactive positional encoding system for paper can be printed with carbon black ink which absorbs much of the near-IR active illuminator (e.g., LED), and hence an acceptable level of contrast is provided to an imager in a camera. However, such a pattern is reflective in the visual spectrum, and distorts the information provided on the paper. These small dots have a high contrast ratio and are faintly visible to the human eye. When compared to a display without this printed film, the difference in fidelity of the image can easily be discerned. Accordingly, the use of diffusive emissive elements would improve image quality of printed products, while providing the advantages of a positionally encoded pattern printed thereon. Moreover, the inks or carrier used to print the diffusive emissive elements would be substantially clear in the visible spectrum such that the images from the underlying medium would not be distorted or occluded. Additionally, the carrier would be transparent to the IR light emitted from the IR light source.

Figure 3:
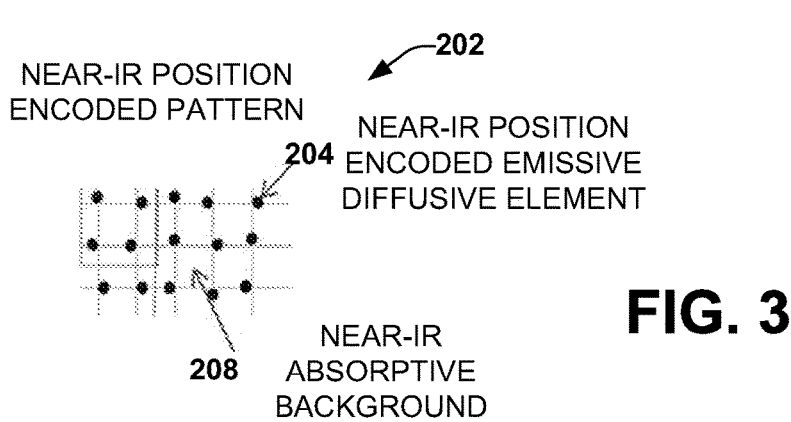
FIG. 3 illustrates examples of position encoded patterns of diffusive emissive elements.

FIG. 3 illustrates examples of near-IR position encoded patterns of diffusive emissive elements. In one example, an encoded pattern 202 can include position encoded diffusive emissive elements 204 that are responsive to light in the near-IR spectrum (also referred to as elements) that are positioned on a near-IR absorptive background 208 (e.g., a display background layer). Thus, in this example, when near-IR radiation is applied to the pattern 202, the elements 204 emit a signal and the background 208 absorbs the radiation which in turn provides contrast between the background and the elements. This pattern 202 between absorbed and reflected light can be detected to determine a location within the patterned surface, such as determining location with respect to a digital pen described above. In one example, the position encoded elements can be disposed as dots (e.g., small circles of an ink containing diffusive emissive elements) on the background 208. Substantially any shape can be employed for the elements (e.g., circle, square, triangle, and so forth).

The use of a transparent medium layer and carrier using near-IR diffusive emissive elements such as plasmonic resonant nanoparticles provides for a low-cost printable solution that can be used on both paper and films (e.g., for displays). The resulting medium layers render positionally-encoded dot patterns that can be read effectively by a detector (e.g., a digital pen). This transparent medium layers provide significant advantages over near-IR absorbing inks relative to the system's background contrast requirements as well as presenting a high fidelity image to the user of the detector, be it on a digital display or other surface.

Additionally, employing particles that emit light in a diffuse or scattered pattern provides enhanced capture capabilities compared to other reflective or emissive systems. For example, specular reflective surfaces are angular dependent relative to the orientation of the illuminating source, e.g., a light source embedded in the detector. By contrast, a diffusive emissive surface evenly distributes reflected or emitted light, creating a greater range of angles at which the detector is capable of receiving light from the nanoparticles.

In the example of FIG. 2, each collection of diffusive emissive elements 240 can be capable of emitting light in a diffuse or scattered pattern. For example, the diffusive emissive elements 240 can be organized as a collection of nanoparticles composed of a material capable of producing a Surface Plasmon Resonance (SPR) in response to incident light in the near-IR spectrum. The size and composition (concentration of nanoparticles) of the diffusive emissive elements would determine the transparency of the elements in the visible spectrum, as well as ensure the proper reflective characteristics. Thus, the surface plasmonic resonance and it's induced scattering of near-IR irradiance is determined by controlling the particle's shape and size as well as the material on which the particles are disposed, thereby controlling the interaction of a particular wavelength of light with the particle's surface and the induced scattering of light. In one example, diffusive emissive elements 240 are metallic nanoparticles that induce the plasmonic effect and it's induced near-IR light scattering in response to a predetermined frequency of light. The plasmonic effect employs nanoparticles that act as antennas that take the incoming resonant single wavelength light and, through the surface plasmons surrounding the metallic nanoparticles, create a resonant effect. The resonant plasmons then release the tuned near-IR irradiance in a scattered manner. This resonant conversion process results in a scattered irradiance (near-IR) signal in response to the incident light.

As such, a diffusive emissive element 240 can be a collection of metallic nano-scale spheres (e.g., silver or gold) is provided with dimensions selected to induce SPR but remain transparent to visible light. The size of each of the diffusive emissive elements nanoparticles 240 can vary based on factors such as desired resolution and the overall size of the display apparatus 200. As an example, the diffusive emissive element 240 can be made to be a dot approximately 100 µm in diameter with a dispersion of numerous spherical nanoparticles made of silver with an approximate diameter of 230 nm dispersed within the dot. Alternatively a dispersion of silver nano-platelets with an aspect ratio of about 10 to 1, e.g., about 120 nm in length/diameter and 12 nm thick could be used to effect a diffuse emissive element In another example, diffusive emissive elements 240 can be a quantum dot dispersed within a carrier for printing. A quantum dot is a nanocrystal made of semiconductor materials that are small enough to exhibit quantum mechanical properties. The electronic characteristics of a quantum dot are closely related to size and shape. For example, the band gap in a quantum dot which determines the frequency range of light emitted in response to incident light is inversely related to its size. In fluorescent dye applications, the frequency of emitted light increases as the size of the quantum dot decreases. Consequently, the wavelength of emitted light shifts when the size of the quantum dot is made smaller. This allows the excitation and emission of quantum dots to be highly tunable. As such, a quantum dot can be specifically tuned to absorb light in the near-IR from a light source and reemit light in the IR spectrum. Moreover, a quantum dot emits light in virtually every direction, ensuring a diffuse response to a light source of an appropriate wavelength. Alternatively, near-IR florescent organic dyes can be used to affect the diffuse emissive element by including such a near-IR dye in the ink or other carrier used to deposit the diffuse emissive element.

Figure 4:
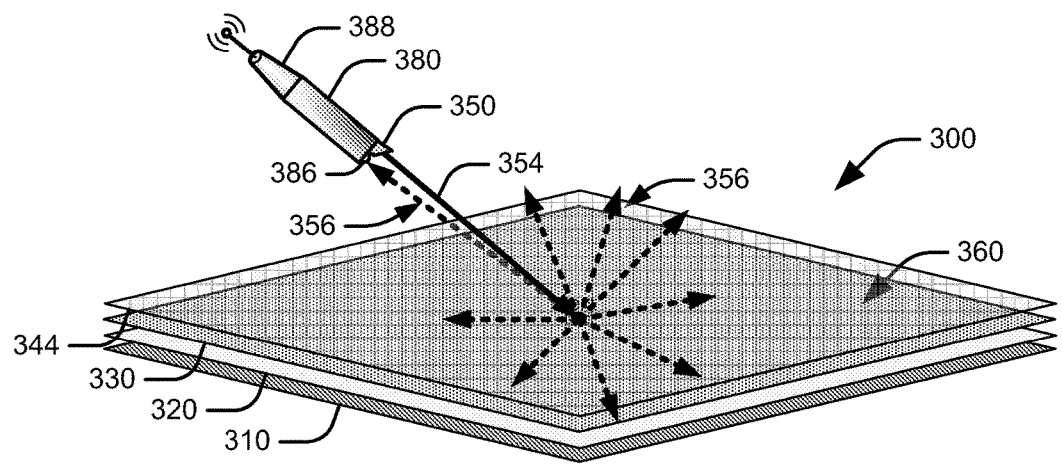
FIG. 4 illustrates another example position encoded display apparatus.

FIG. 4 illustrates an example system with a digital pen 380 interacting with a display apparatus 300. A display stack is provided with a backlight layer 310, a PCT layer 320, a medium layer 330 with diffusive emissive elements disposed thereon, and a transparent cover layer 344. A digital pen 380 can include a light source 350 and a sensor 386, e.g., a camera sensitive to invisible light. In the example of FIG. 4, the camera 386 is integrated with the digital pen 380 and set up to sense the signal 356 emitted from excitation of diffusive emissive elements. The light source 350 and camera 386 can be collocated at a position on the digital pen 380. Accordingly, when the digital pen 380 is being employed as a pointer or writing implement, the light source 350 can illuminate the diffusive emissive elements disposed on the surface and the camera 386 can sense the signal 356 emitted from the diffusive emissive elements.

FIG. 4 shows the display apparatus 300 is illuminated by light 354 from light source 350, thereby exciting a plurality of diffusive emissive elements to emit a signal 356 in a scattered manner. Where the digital pen 380 will be used as an input device to a tablet or where the digital pen 380 will be used similar to a drafting pen, physical displacement of the digital pen 380 across the surface of the display 300 affects the scan rate, exposure, and blur reduction capacities of the digital pen 380 to properly discern the pattern of diffusive emissive elements. Digital pen 380 can include a processor to run machine readable instructions related to the capture and processing of signal 356, and/or a transmitter 388 to provide information to a remote system, e.g., the display 300 or a computer connected to the display 300. Additional logic can therefore be incorporated into the digital pen 380 to increase or decrease the digital pen 380 scan rate based at least in part upon the velocity with which the digital pen 380 is moved across the surface of the display 300. Similarly, the logic providing for exposure compensation and blur reduction can also be incorporated into the digital pen 380 based at least in part upon the velocity with which the digital pen 380 is moved across the surface of the display 300. The light source 350 can illuminate the display with a series of pulses of a predetermined duty cycle to mitigate the blur caused by movement of the digital pen 380.

Figure 5:
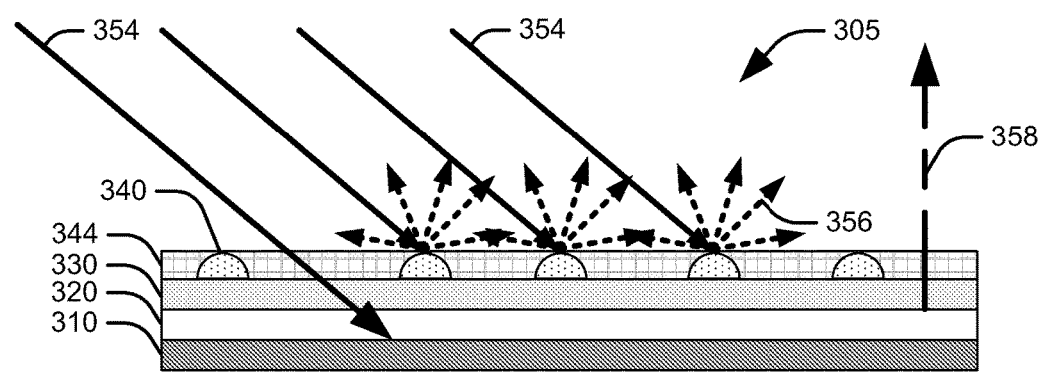
FIG. 5 illustrates a cross sectional view of the position encoded apparatus of FIG. 4.

FIG. 5 illustrates a cross sectional view 305 of the illuminated display apparatus 300, as provided in FIG. 4. A light source can provide the light 354 in the near-IR spectrum, for example with a wavelength of about 750 nm to about 1000 nm. The transparent medium layer 330 having a predetermined pattern of diffusive emissive elements 340 can be disposed proximate the surface of display apparatus 300, to respond to at least a portion of the incident light 354 to excite the diffusive emissive elements 340 and provide a signal 356 in response thereto. Light 354 passing through the medium layer 330 but not incident at a location of element 340 is absorbed by the backlight layer 310 of the display apparatus 300, ensuring a strong contrast between the signal emitted by diffusive emissive elements 340 and the absorptive effect from backlight layer 310.

As shown in FIG. 5, signal 356 is emitted from excited diffusive emissive elements 340 arranged in a predetermined pattern, making it possible for a detector to capture the emitted signal 356 and read information encoded by the positional relationship of the diffusive emissive elements 340. Based upon the information encoded in the unique position between the diffusive emissive elements 340, a detector can determine a location on the surface of display 300. The pattern and density of the diffusive emissive elements 340 contributes to the accuracy of digital pen in determining a location with respect to the display apparatus 300. In other words, higher density pattern of diffusive emissive elements 340 disposed across the surface of display apparatus generally improves the accuracy of the location determination by a detector. Based upon the unique encoded absolute positional information between the diffusive emissive elements, a precise determination of a location with respect to the pattern of diffusive emissive elements 340 is possible. Any comparable predetermined pattern capable of providing unique encoded absolute positional information between the diffusive emissive elements 340 may be similarly employed to dispose or locate the diffusive emissive elements 340 in, on, or about the medium layer 330.

Since the diffusive emissive elements 340 are imperceptible or almost imperceptible to the human eye and do not interfere with the visual content of the backlight layer 310, light 358 emitted by the backlight layer 310 will appear uniform across the display regardless of the density and arrangement of diffusive emissive elements 340. The ability to provide a transparent medium layer 330 containing diffusive emissive elements 340 enables the use of a detector sensitive to the emission of IR light from the diffusive emissive elements 340. The detector can then determine a physical location or position on the display and provide location based data to the detector while simultaneously providing a minimally impaired view from the backlight layer 310 to the user. Thus, the display apparatus has the ability to contemporaneously function as both an input device (e.g., a device capable of detecting location based input via the digital pen 380) and an output device (e.g., a display capable of displaying data).

Figure 6:
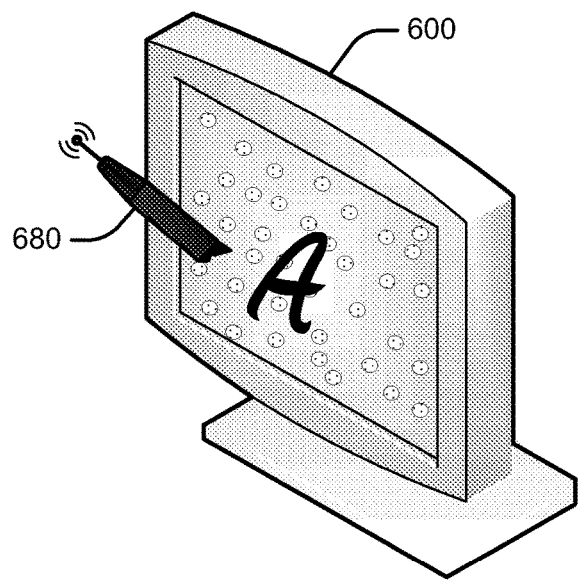
FIG. 6 illustrates an example implementation of a position encoded display apparatus.

FIG. 6 is an example implementation of a display apparatus such as described in FIGS. 1-5. FIG. 6 provides a digital pen 680 interacting with a digital display apparatus 600, such as a computer monitor, television screen, tablet, or other display surface. As the digital pen 680 moves across the display encoded with diffusive emissive elements arranged in the predetermined pattern, the series of stokes created by the movement of the digital pen 680 are processed for presentation on the display apparatus 600. In the example of FIG. 6, the movement of the digital pen 680 represents a letter "A". However, any movement can be similarly processed and presented. For example, shapes, foreign script, or free-form drawings can be presented. Moreover, the processor can be associated with software to implement specific character recognition and presentation.

Figure 7:
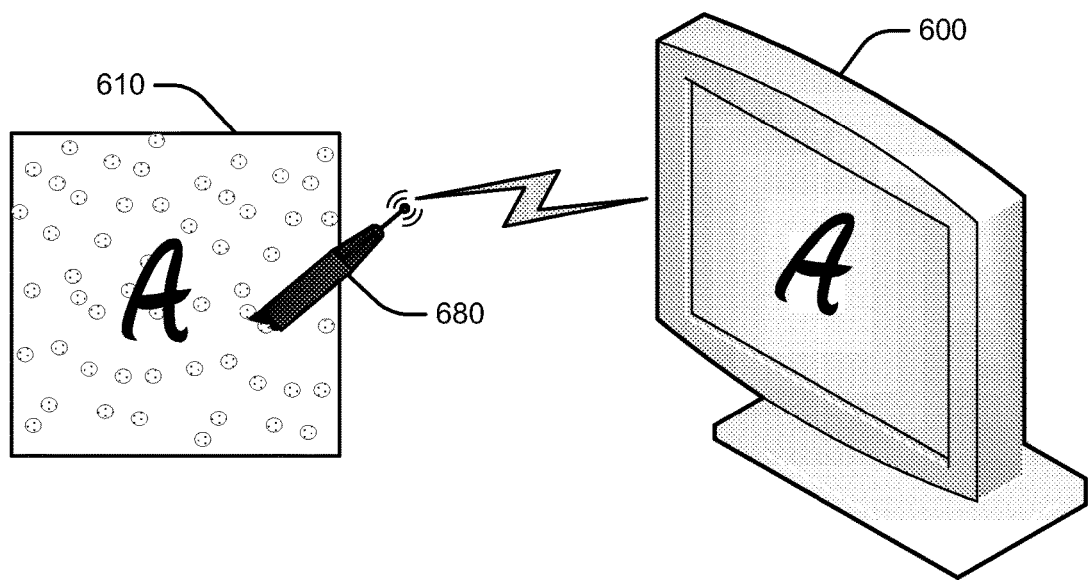
FIG. 7 illustrates another example implementation of a position encoded display apparatus.

FIG. 7 is another example implementation of a display apparatus. In the example of FIG. 7, the digital pen 680 is moving across a media 610 with diffusive emissive elements 640 arranged in an encoded pattern that is remote from the display apparatus 600. In the example of FIG. 7, as the digital pen 680 moves across the media 610, information relative to a location on the media 610 is provided to the display apparatus 600 by a transmitter for presentation thereon. Consequently, movement across the screen, such as strokes representing characters, images and/or text, can be displayed on display apparatus 600 even as the digital pen 680 is not in direct contact with it.

Figure 8:
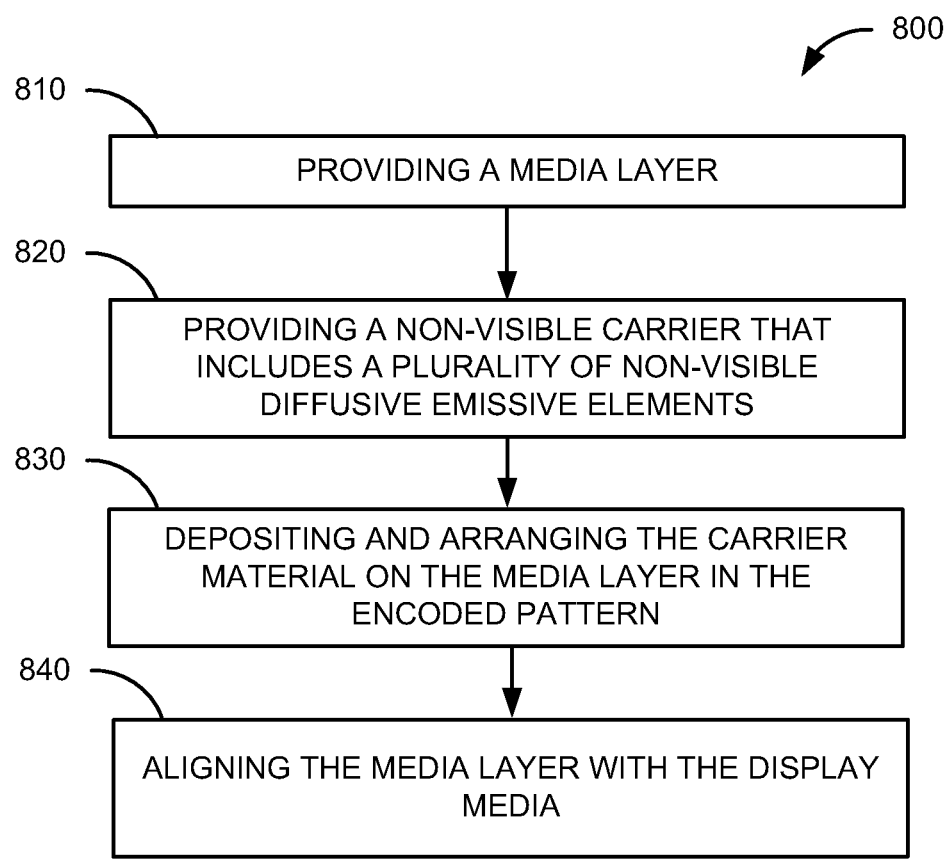
FIG. 8 illustrates an example of a flowchart of a method for producing a medium layer having a position encoded pattern.

FIG. 8 is a flow diagram depicting method 800 for providing a display media with a non-visible encoded pattern. While, for purposes of simplicity of explanation, the method 800 of FIG. 8 is shown and described as executing serially, the method 800 is not limited by the illustrated order, as some actions could in other examples occur in different orders and/or concurrently from that shown and described herein. Additionally, where the disclosure or claims recite "a," "an," "a first," or "another" element, or the equivalent thereof, it should be interpreted to include one or more than one such element, neither requiring nor excluding two or more such elements. In view of the foregoing structural and functional features described above, example methods will be better appreciated with reference to FIGS. 1-7.

Method 800 provides at 810 a transparent medium layer, such as the medium layer 230 described with reference to FIG. 2. At 820, a non-visible carrier, e.g., a printable ink, that includes a plurality of non-visible diffusive emissive elements, for example the diffusive emissive elements 240 described with reference to FIG. 2, is provided. At 830, the carrier material is deposited and arranged on to the media layer in the encoded pattern. For example, the encoded pattern is arranged to provide information with respect to the unique spatial arrangement of the diffusive emissive elements (e.g., diffuse emissive elements 240), as shown in FIG. 3. At 840, the media layer is aligned with the display media. The resulting media layer and display media can be, for example, part of a display apparatus 200, as described with respect to FIG. 2.

What have been described above are examples. It is, of course, not possible to describe every conceivable combination of components or methods, but one of ordinary skill in the art will recognize that many further combinations and permutations are possible. Accordingly, the disclosure is intended to embrace all such alterations, modifications, and variations that fall within the scope of this application, including the appended claims.

What is claimed is:

1. A display comprising:
   a display stack to generate a digital display image;
   a media layer that includes a plurality of diffusive emissive elements disposed in a predetermined pattern, wherein the diffusive emissive elements:
      reside in a carrier material to emit a scattered signal;
      induce a surface plasmon resonance in response to light incident to the media layer; and provide information for a positional relationship between relative diffusive emissive elements to determine a location on the media layer.

2. The display of claim 1, wherein the light comprises infrared (IR) light.

3. The display of claim 1, wherein the light comprises a wavelength of about 725 nm to about 1000 nm.

4. The display of claim 1, wherein the light is strobed at a predetermined duty cycle.

5. The display of claim 1, wherein the diffusive emissive elements comprise metallic nanoparticles residing in the carrier material and the light comprises infrared (IR) light.

6. The display of claim 1, wherein the media layer and the diffusive elements are substantially optically transparent to visible light.

7. A display apparatus comprising:
 a display stack comprising:
 at least one layer to generate a digital display image;
 a medium layer; and
 a carrier material disposed on the medium layer in an encoded pattern representing information, the carrier material carrying metallic nanoparticles to induce a surface plasmon resonance in response to non-visible light; and
a near-infrared (IR) source to generate the non-visible light.

8. The apparatus of claim 7 further comprising a digital pen, the digital pen comprising:
 a camera to collect the diffusive signal;
 a processor to decode information from the encoded pattern; and
 a transmitter to provide the information to the display stack.

9. The apparatus of claim 8, wherein the light source strobes light at a predetermined duty cycle.

10. The apparatus of claim 7, wherein the medium layer and the metallic nanoparticles are sized to be substantially optically transparent to visible light.

11. A method of providing a display media with a non-visible encoded pattern, the
 method comprising:
 providing a media layer;
 providing a non-visible carrier material that includes a plurality of non-visible diffusive emissive elements;
 depositing and arranging the carrier material on the media layer in the encoded pattern, wherein each of the plurality of diffusive emissive elements includes metallic nanoparticles to induce surface plasmon resonance in response to non-visible light; and
 aligning the media layer with the display media.

12. The method of claim 11, wherein depositing and arranging comprises printing the carrier that includes the plurality of diffusive emissive elements in the encoded pattern.

13. The method of claim 11, further comprising applying the medium layer to a layered display stack.

14. The method of claim 11, wherein the media layer and the plurality of diffusive elements are substantially optically transparent to visible light.

\* \* \* \* \*